United States Patent

Bayer et al.

[11] Patent Number: 5,376,340
[45] Date of Patent: Dec. 27, 1994

[54] REGENERATIVE THERMAL OXIDIZER

[75] Inventors: Craig E. Bayer, Wellsville; William G. Heard, Bath, both of N.Y.

[73] Assignee: ABB Air Preheater, Inc., Wellsville, N.Y.

[21] Appl. No.: 47,798

[22] Filed: Apr. 15, 1993

[51] Int. Cl.⁵ .............................. F01N 3/10
[52] U.S. Cl. ......................... 422/175; 422/177; 422/171; 422/178; 431/5; 431/170; 110/245; 110/345
[58] Field of Search ........ 422/171, 172, 175, 177–178; 431/5, 170; 110/345, 210–212, 245; 423/245.3, 247, 179–181

[56] References Cited

U.S. PATENT DOCUMENTS

| | | | |
|---|---|---|---|
| 3,870,474 | 3/1975 | Houston | 422/171 |
| 4,444,735 | 4/1984 | Birmingham et al. | 422/111 |
| 4,741,690 | 5/1988 | Heed | 431/7 |
| 4,957,710 | 9/1990 | Nagai et al. | 422/171 |
| 4,985,211 | 1/1991 | Akiyama et al. | 422/171 |
| 5,024,817 | 6/1991 | Mattison | 431/5 |
| 5,186,901 | 2/1993 | Bayer et al. | 422/177 |
| 5,188,804 | 2/1993 | Pace et al. | 422/177 |
| 5,262,131 | 11/1993 | Bayer et al. | 422/175 |

Primary Examiner—Robert J. Warden
Assistant Examiner—Hien Tran
Attorney, Agent, or Firm—Chilton, Alix & Van Kirk

[57] ABSTRACT

A regenerative thermal oxidizer for oxidizing a contaminant in an air or other gas stream includes a heat transfer material which heats the incoming air and collects heat from the exiting air. The direction of flow of the air through the oxidizer is periodically reverse for the regenerative heat exchange. When flow is reversed, a quantity of untreated air in the oxidizer which would otherwise be discharged to the atmosphere is collected in a purge chamber which surrounds the lower portion of the discharge stack. The untreated air enters the bottom of the chamber and the air already in the chamber is forced out from vent holes in the top of the chamber into the stack. The untreated air in the chamber is fed back to the oxidizer through the inlet of the blower feeding the oxidizer while clean air is drawn into the chamber from the stack through the vent holes.

4 Claims, 1 Drawing Sheet

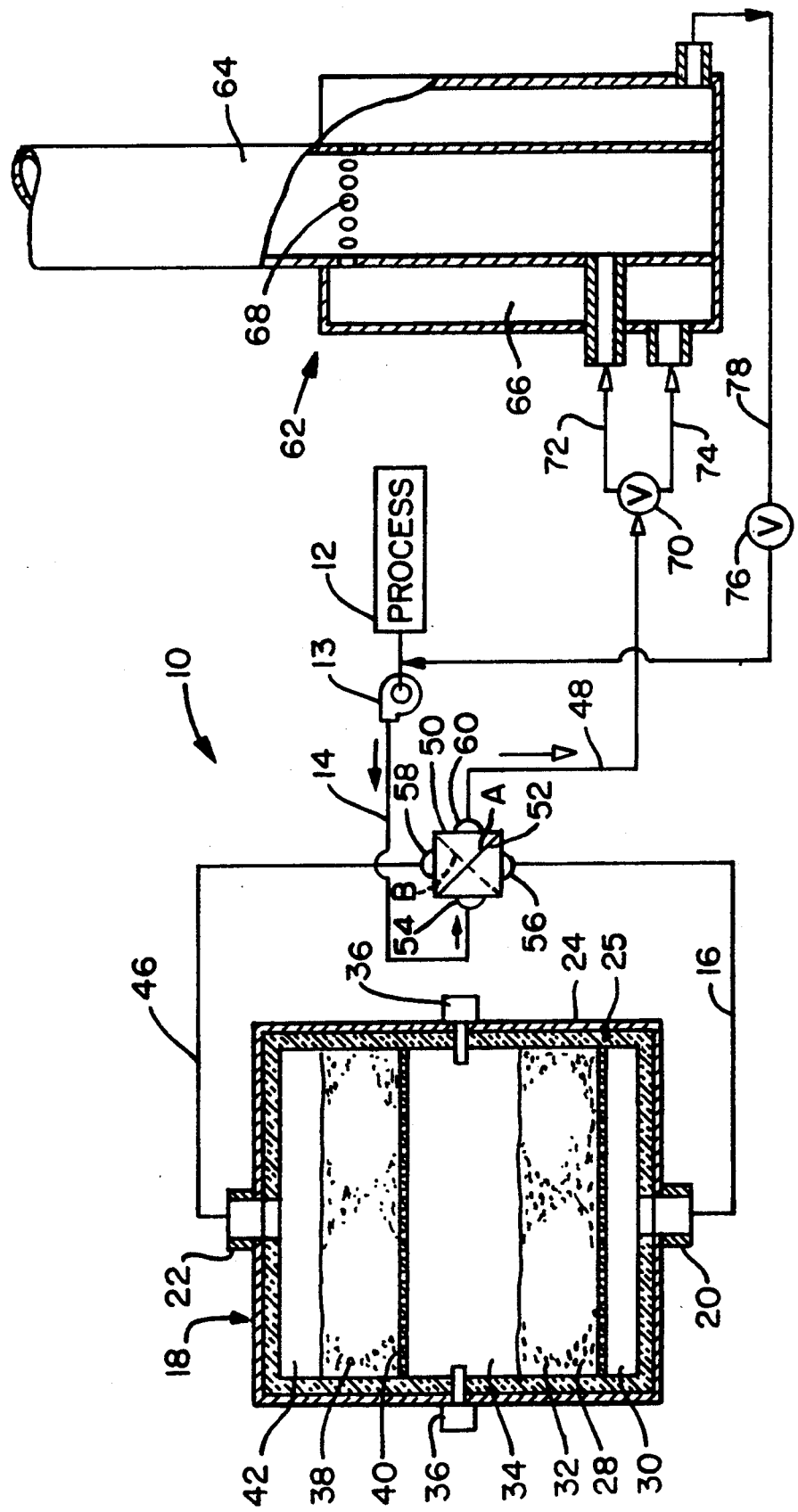

REGENERATIVE THERMAL OXIDIZER

BACKGROUND OF THE INVENTION

The present invention relates to apparatus for destroying contaminants such as volatile organic compounds in an air or other gas stream prior to release to the atmosphere.

More specifically, the invention relates to the incineration or oxidation of such contaminants in a reversing flow-type incinerator and to the system for collecting untreated gas that would be discharged when the flow is reversed and then treating that collected gas.

Many manufacturing operations produce waste gases or exhaust air which include environmentally objectionable contaminants, generally combustible fumes such as solvents and other hydrocarbon substances, e.g., gasoline vapors, paint fumes and chlorinated hydrocarbons. The most common method of eliminating such combustible fumes prior to emitting the exhaust gases to the atmosphere is to incinerate the waste gas or exhaust air stream.

One method of incinerating the contaminants is to pass the waste gas or exhaust air stream through a fume incinerator prior to venting the waste gas or exhaust air stream into the atmosphere. An example of a fume incinerator for incinerating combustible fumes in an oxygen bearing process exhaust stream is disclosed in U.S. Pat. No. 4,444,735. In such a fume incinerator, the process gas stream is passed through a flame front established by burning a fossil fuel, typically natural gas or fuel oil, in a burner assembly disposed within the incinerator. In order to improve efficiency, it may be desirable to preheat the process exhaust stream prior to passing it through the flame front.

Another type of incinerator commonly used for incinerating contaminants in process exhaust streams is the multiple-bed, fossil fuel-fired regenerative incinerator, such as, for example, the multiple-bed regenerative incinerators disclosed in U.S. Pat. Nos 3,870,474 and 4,741,690. In the typical multiple-bed systems of this type, two or more regenerative beds of heat-accumulating and heat-transferring material are disposed about a central combustion chamber equipped with a fossil fuel-fired burner. The process exhaust stream to be incinerated is passed through a first bed, then into the central combustion chamber for incineration in the flame produced by firing auxiliary fuel therein, and then discharged through a second bed. As the incinerated process exhaust stream passes through the second bed, it loses heat to the material making up the bed. After a predetermined interval, the direction of gas flow through the system is reversed such that the incoming process exhaust stream enters the system through the second bed, wherein the incoming process exhaust stream is preheated prior to entering the central combustion chamber, and discharges through the first bed. By periodically reversing the direction of gas flow, the incoming process exhaust stream is preheated by absorbing heat recovered from the previously incinerated process exhaust stream, thereby reducing fuel composition.

A somewhat more economical method of incinerating combustible contaminants, such as solvents and other hydrocarbon based substances, employed a single regenerative bed as disclosed in U.S. Pat. No. 4,741,690. In the process presented therein, the contaminated process exhaust stream is passed through a single heated bed of heat absorbent material having heat-accumulating and heat-exchanging properties, such as sand or stone, to raise the temperature of the contaminated process exhaust stream to the temperature at which combustion of the contaminants occurs, typically to a peak preheat temperature of about 900° C., so as to initiate oxidization of the contaminants to produce carbon-dioxide and water. Periodically, the direction of flow of the process exhaust stream through the bed is reversed. As the contaminants combust within the center of the bed, the temperature of the process exhaust stream raises. As the heated exhaust stream leaves the bed, it loses heat to the heat-accumulating material making up the bed and is cooled to a temperature about 20° C. to 25° C. above the temperature at which it entered the other side of bed. By reversing the direction of the flow through the bed, the incoming contaminated process exhaust stream is preheated as it passes that portion of the bed which has just previously in time been traversed by the post-combustion, hot process exhaust stream, thereby raising the temperature of the incoming process exhaust stream to the point of combustion by the time the incoming process exhaust stream reaches the central portion of the bed.

Another type of regenerative thermal oxidizer employs catalyst bed in addition to the beds of heat-accumulating and heat-transferring material. One such system is described in U.S. patent application Ser. No. 879,934 filed May 8, 1992, now U.S. Pat. No. 5,262,131.

In any of these regenerative thermal oxidizers, during the reversal of flow direction, there is a quantity of gas that has entered the vessel but has not yet proceeded to the point of reaction. When the switch in direction occurs, this untreated gas is forced back out of the vessel and is discharged to the atmosphere. Of course, this discharge of untreated gas is undesirable.

SUMMARY OF THE INVENTION

It is an object of the present invention to provide a system for a regenerative thermal oxidation system to capture untreated gas that would otherwise be discharged to the atmosphere when the direction of flow through the oxidation system is reversed and then feed that untreated gas back through the oxidizer.

According to the invention, a thermal oxidizer is provided for destroying contaminants in a gas stream wherein the oxidizer also functions as a regenerative heat exchanger. In operation, the flow of gas through the oxidizer is periodically reversed. When this reversal occurs, valving means switch the flow of the exit gas from the discharge stack to a storage device where the untreated gas is rapidly stored and then slowly fed back to the oxidizer. This prevents untreated gas from being discharged to the atmosphere.

BRIEF DESCRIPTION OF THE DRAWINGS

The drawing is a schematic flow diagram showing a regenerative thermal oxidation system incorporating the present invention.

DESCRIPTION OF THE PREFERRED EMBODIMENT

The FIGURE shows a regenerative thermal oxidizer system 10 situated downstream from an industrial process generally represented by schematic block 12 which produces an air or other gas stream containing a contaminant. For example, a by-product of the process 12 may include a volatile organic compound, such as ethanol, hexane or butane. For purposes of this description, the stream will be referred to as an air stream but it could just as well be other gas streams.

The air stream including the contaminant is forced from the process 12 by the blower or fan 13 through line 14 and delivered, via inlet line 16, to the regenerative thermal oxidizer 18. The particular oxidizer shown and described is only by way of example and any regenerative thermal oxidizer could be used with the invention. The oxidizer 18 has ports 20 and 22 at the lower and upper ends of an otherwise closed and sealed steel casing 24. The casing is preferably lined with insulating material such as ceramic 26 to minimize heat loss through the casing walls.

At the lower end of the casing, a perforated steel plate or the like 28 defines a distribution chamber 30 which receives the inlet air stream through port 20 and distributes the air substantially uniformly across the cross-section of the casing. This perforated steel plate 28 also supports the bed 32 of heat-accumulating and heat-transferring material. This bed may be formed from gravel or any other suitable material.

Located above the bed 32 is the combustion chamber 34 which is equipped with the fossil fuel fired burners 36 where the contaminants are incinerated. The incinerated air stream then passes up through the bed 38 which is identical to the bed 32 and which is supported on the perforated steel plate 40. As the air passes through the bed 38, heat is transferred from the air to the bed material. The air then flows up into the top chamber 42 and out the port 22.

It can be appreciated that the oxidizer 18 as shown, is substantially symmetric above and below the combustion chamber 34. This arrangement is conducive to the periodic reversal of air flow direction through the oxidizer 18. This can be achieved, for example, by a valve box 50 or the like, having an adjustable baffle or vane structure 52. In the operating mode described immediately above, the air stream in line 14 enters the valve box through port 54, is directed by the baffle 52 in position A, and exits the valve box through port 56 into line 16, whereupon it enters the oxidizer lower end through port 20. The clean air exits the outlet port 22 and is delivered through outlet line 46 into the valve box 50 through port 58 and directed by the baffle 52 in position A toward port 60 and exhaust flow line 48.

Alternatively, baffle 52 can be rearranged into position B, such that the source air stream in line 14 enters the valve box 50 at port 54 and exits the valve box at port 58 for delivery via line 46 to port 22 at the upper end of casing 24. Port 22 thus becomes an inlet port and the air flow is downward through the beds, for discharge at port 20 and delivery via line 16 to the valve box 50 where it enters via port 56 and exits via port 60, into the stack exhaust line 48.

It should be appreciated that the oxidizer 18 shown in the FIGURE, would be substantially equally effective regardless of the air flow direction. For example, in the operating mode first described above, the air enters inlet port 20 where it is preheated as it rises through bed 32. The air is then incinerated in the central combustion chamber 34. As the air continues upwardly, the heat is transferred to the bed 38. This sequence is, of course, reversed in the next cycle of operation, where the air flow is downward through the casing. In that cycle, the incoming air is first heated by the hot bed 38.

Although one type of regenerative thermal oxidizer has been described, various arrangements of the present invention requires only that the oxidizer be operable in a regenerative heat transfer mode with reversal of air flow. In this mode, the incoming air is heated by the previously heated heat transfer material and the exiting air transfers its heat to the heat transfer material. For example, the oxidizer may contain a catalyst or heating means other than fossil fuel burners.

In this regenerative heat transfer mode with reversal of flow through the oxidizer, it can be seen that there will be a certain quantity of untreated air in the oxidizer which would normally be forced into the atmosphere. For example, at the time that the air flow is switched from upflow to downflow, the air in the lower half of the oxidizer would be essentially untreated. Since the flow has been switched to downflow, this quantity of air in the lower half would be discharged to the exhaust flow line 48. It is this untreated exhaust flow which is captured and treated by the present invention.

The purge device of the present invention is generally designated as 62 including a stack or chimney 64. Surrounding the lower portion of the stack 64 is a purge chamber 66. Vent holes 68 connect the inside of the stack to the top portion of the purge chamber 66. The exhaust flow line 48 may be connected through valve 70 either to the stack 64 through line 72 or to the purge chamber 66 through line 74. During normal operation, the valve 70 would be positioned so that the clean air flow would go out the stack.

At the time that the flow through the oxidizer is reversed by changing the position of the valve box 50, the valve 70 would be switched so that the untreated air being purged from the oxidizer will flow into the purge chamber 66. As the untreated air enters the purge chamber, the air that is already in the purge chamber (generally clean air) is vented through the vent holes into the stack 64. The size of the purge chamber 66 is adapted to at least hold the quantity of untreated air which would be contained in and forced out of the oxidized. Once all of the untreated air has been collected in the purge chamber, the valve 70 would be switched again so that the air from the oxidizer, which is now treated air, is routed to the stack 64. The switching of the valve 70 back to its normal operating position can be triggered by one of several parameters such as a pre-selected purge time or by an on-line gas analysis of the purge air.

At this point in the cycle, the purge chamber 66 is essentially full of untreated air. The valve 76 in recycle line 78 is then opened so that the untreated air in the purge chamber 66 can be recycled back to the oxidizer. This recycle occurs because the recycle line 78 is connected to the suction (inlet) side of the blower 13. Therefore, the blower 13 draws the untreated air out or the purge chamber 66 and the purge chamber fills with clean air drawn in from the stack 64 through the vent holes 68. Since the clean air being drawn into the purge chamber at the top from the stack is hot and since the untreated air already in the purge chamber being sent back to the oxidizer from the bottom is cooler, there tends to be a layering of the cool air at the bottom and the hot air at the top which aids in the recycle process. That is an advantage of having the purge chamber surrounding the stack.

We claim:

1. In a thermal regenerative oxidizer system for oxidizing a contaminant in an entering untreated gas stream to produce an exiting treated gas stream wherein said oxidizer system includes an oxidizer containing a bed of regenerative heat transfer material to which heat is transferred by said exiting treated gas stream and which transfers heat to said entering untreated gas stream and including means connected to said oxidizer for forcing said entering untreated gas stream through said oxidizer in a first direction and switching said entering untreated gas stream to an opposite second direction through said oxidizer whereby a quantity of un-oxidized contaminant is discharged from said bed during switching, the improvement comprising vertical stack means connected to said oxidizer for discharging said exiting treated gas stream and means for collecting said quantity of discharged un-oxidized contaminant comprising a vertically oriented annular chamber surrounding at least a portion of said vertical stack means, means for conducting said quantity of discharged un-oxidized contaminant from said oxidizer to said chamber, and means for recycling said collected quantity of discharged un-oxidized contaminant from said chamber back to said oxidizer.

2. A thermal regenerative oxidizer system as recited in claim 1 wherein said vertically oriented annular chamber has a bottom portion and a top portion and wherein said means for conducting said quantity of discharged un-oxidized contaminant from said oxidizer to said chamber is connected to said bottom portion of said chamber and further including vent holes located in said top portion of said chamber forming a flow path from said chamber into said stack.

3. A thermal regenerative oxidizer system as recited in claim 2 wherein said means for recycling said collected quantity of discharged un-oxidized contaminant back to said oxidizer includes means for feeding said recycle to said means for forcing said entering untreated gas stream through said oxidizer.

4. A thermal regenerative oxidizer system as recited in claim 3 wherein said means for feeding said recycle is connected to the bottom portion of said chamber.

* * * * *